United States Patent
Bui et al.

(10) Patent No.: US 11,247,173 B1
(45) Date of Patent: Feb. 15, 2022

(54) TWO-STAGE MIXER (71) Applicant: Caterpillar Inc., Peoria, IL (US)

(72) Inventors: Yung T. Bui, Peoria, IL (US); Srinivasa Perumal Velu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/990,047

(22) Filed: Aug. 11, 2020

(51) Int. Cl.
| | |
|---|---|
| *F01N 3/28* | (2006.01) |
| *B01D 53/94* | (2006.01) |
| *B01F 5/04* | (2006.01) |
| *B01F 5/06* | (2006.01) |
| *F01N 3/20* | (2006.01) |
| *B01F 3/04* | (2006.01) |

(52) U.S. Cl.
CPC ...... *B01D 53/9431* (2013.01); *B01F 3/04007* (2013.01); *B01F 5/0451* (2013.01); *B01F 5/0612* (2013.01); *F01N 3/2066* (2013.01); *F01N 3/2892* (2013.01); *F01N 2610/1453* (2013.01)

(58) Field of Classification Search
CPC . F01N 3/2892; F01N 3/2066; B01D 53/9431; B01F 5/0612; B01F 5/0451
USPC .................................................. 422/176, 183
See application file for complete search history.

(56) References Cited

U.S. PATENT DOCUMENTS

| | | | | |
|---|---|---|---|---|
| 7,448,206 B2 | 11/2008 | Bosch | | |
| 7,533,520 B2 * | 5/2009 | Cheng | ................... | B01F 5/0616 60/286 |
| 7,784,273 B2 * | 8/2010 | Kanaya | ............... | B01D 53/9431 60/286 |
| 8,141,353 B2 * | 3/2012 | Zheng | ................... | B01F 5/0616 60/324 |
| 8,359,832 B2 * | 1/2013 | Yi | .......................... | B01F 5/0618 60/286 |
| 8,371,114 B2 * | 2/2013 | Hayashi | ................ | F01N 3/2066 60/317 |
| 8,607,555 B2 * | 12/2013 | Kaiser | ................. | B01F 3/04049 60/324 |
| 8,615,984 B2 | 12/2013 | Kornherr et al. | | |
| 9,302,223 B2 | 4/2016 | Bui et al. | | |
| 9,718,037 B2 * | 8/2017 | Harmon | ............... | B01F 5/0473 |
| 9,732,652 B2 | 8/2017 | Fukui et al. | | |
| 2011/0174407 A1 * | 7/2011 | Lundberg | .............. | B01F 5/0616 138/37 |

(Continued)

FOREIGN PATENT DOCUMENTS

| | | |
|---|---|---|
| EP | 3141719 B1 | 11/2018 |
| KR | 101717603 B1 | 4/2017 |

*Primary Examiner* — Tom P Duong
(74) *Attorney, Agent, or Firm* — Harrity & Harrity LLP (57) ABSTRACT

A two-stage mixer may include a guiding element and a mixing element. The guiding element may be configured to be fixedly mounted to an interior of an exhaust conduit. The mixing element may be configured to be fixedly mounted to the interior of the exhaust conduit in a position downstream from the guiding element. The mixing element may include a central disk, a plurality of mounting arms extending radially from the central disk, and a plurality of blades extending radially from the central disk. At least one mounting arm of the plurality of mounting arms may include a fin extending therefrom, and at least one blade of the plurality of blades may include a fin extending therefrom.

20 Claims, 5 Drawing Sheets

(56) References Cited

U.S. PATENT DOCUMENTS

| | | | | |
|---|---|---|---|---|
| 2012/0204541 A1* | 8/2012 | Li | ............... | B01F 13/1027 |
| | | | | 60/274 |
| 2012/0320708 A1* | 12/2012 | Geibel | ............ | F01N 3/2073 |
| | | | | 366/337 |
| 2013/0170973 A1* | 7/2013 | Staskowiak | ...... | B01F 5/0616 |
| | | | | 415/208.1 |
| 2014/0033686 A1* | 2/2014 | Fischer | ........... | F01N 13/08 |
| | | | | 60/286 |
| 2016/0175784 A1* | 6/2016 | Harmon | ........ | B01F 3/04049 |
| | | | | 366/167.1 |
| 2020/0123955 A1 | 4/2020 | Liu et al. | | |

\* cited by examiner

TWO-STAGE MIXER

TECHNICAL FIELD

The present disclosure relates generally to a mixer for two or more fluids and, for example, to a two-stage mixer for homogenizing a flow of the two or more fluids in an exhaust aftertreatment system.

BACKGROUND

In an exhaust aftertreatment system, a reductant injector introduces a reductant (e.g. a urea solution, an anhydrous ammonia, an aqueous ammonia, and/or the like) into an exhaust conduit, which guides an exhaust stream from an engine to a selective catalytic reduction (SCR) module. Once the exhaust stream enters the SCR module, the reductant selectively reacts with nitrous oxides (NOx) within the exhaust stream to convert the NOx into other compounds that satisfy emissions standards, such as Dinitrogen ($N_2$), water ($H_2O$), Carbon Dioxide ($CO_2$), and/or the like.

However, once the reductant is introduced into the exhaust stream, the reductant tends to settle onto surfaces of the exhaust conduit and, over time, may form crystallized deposits that obstruct flow of the exhaust stream. Furthermore, the reductant, as introduced by the reduction injector, tends to non-uniformly mix with the exhaust stream, which may result in undesirable compounds passing through the SCR module. For example, due to the exhaust stream having too little reductant in some portions thereof, the exhaust aftertreatment system may discharge an excess of nitrous oxides and thus fail to satisfy emission standards. As a further example, due to the exhaust stream having an excess of reductant in other portions thereof, the exhaust aftertreatment system may discharge unreacted ammonia ($NH_3$), often referred in as ammonia slip.

One attempt to improve performance of an exhaust aftertreatment system is disclosed in Korean Patent, KR 101717603 B1 ("the '603 patent"), which issued to Song Il Hwan on Apr. 5, 2017. In particular, the '603 patent discloses a mixer apparatus for distributing a reducing agent before an exhaust gas enters an SCR device. The mixer apparatus includes a casing part and a mixing unit arranged inside the casing part. The mixing unit has an inner tube, an outer tube, a first blade part disposed between the outer tube and the casing part, and a second blade part disposed between the inner tube and the outer tube. One or more support parts may be further disposed to connect the inner tube and the outer tube to each other and be supported on an inner circumferential side of the casing part. For example, the support part may be divided into a vertical support part supported in the longitudinal direction and a horizontal support part supported in the transverse direction.

The two-stage mixer of the present disclosure is directed to overcoming one or more of the problems set forth above.

SUMMARY

In some implementations, a two-stage mixer includes a guiding element that is configured to be fixedly mounted to an interior of an exhaust conduit; and a mixing element that is configured to be fixedly mounted to the interior of the exhaust conduit in a position downstream from the guiding element, the mixing element comprising: a central disk, a plurality of mounting arms extending radially from the central disk, wherein each mounting arm of the plurality of mounting arms has a first side edge having a first length, and wherein at least one mounting arm of the plurality of mounting arms has a fin extending from the first side edge, and a plurality of blades extending radially from the central disk, wherein each blade of the plurality of blades has a second side edge having a second length that is less than the first length, wherein at least one blade of the plurality of blades has a fin extending from the second side edge.

In some implementations, a two-stage mixer includes an exhaust conduit having an interior; a guiding element that is fixedly mounted to the interior of the exhaust conduit, the guiding element comprising a planar body; and a mixing element that is fixedly mounted to the interior of the exhaust conduit in a position downstream from the guiding element, the mixing element comprising: a central disk, a plurality of mounting arms extending radially from the central disk and fixedly secured to the interior of the exhaust conduit, wherein each mounting arm of the plurality of mounting arms has a first side edge having a first fin extending therefrom, and a plurality of blades extending radially from the central disk, wherein each blade of the plurality of blades has a second side edge having a second fin extending therefrom.

In some implementations, an exhaust aftertreatment system includes a reductant injector that is configured to inject reductant into an exhaust stream; a guiding element that is configured to be arranged within the exhaust stream to break apart and guide droplets of the reductant along the exhaust stream; and a mixing element that is configured to be arranged within the exhaust stream in a position downstream and spaced apart from the guiding element to cause the droplets to be distributed within the exhaust stream, the mixing element comprising a central disk, a plurality of mounting arms extending radially from the central disk and having a first length, and a plurality of blades extending radially from the central disk and having a second length that is less than the first length.

DETAILED DESCRIPTION

This disclosure relates to a two-stage mixer, which is applicable to any system involved in combing two or more fluids. For example, the system may be a power system, an exhaust aftertreatment system, and/or the like. The system may be implemented in a vehicle, such as a motor vehicle, a railed vehicle, a watercraft, an aircraft, and/or the like.

To simplify explanation below, the same reference numbers may be used to denote like features. The drawings may not be to scale.

Figure 1:
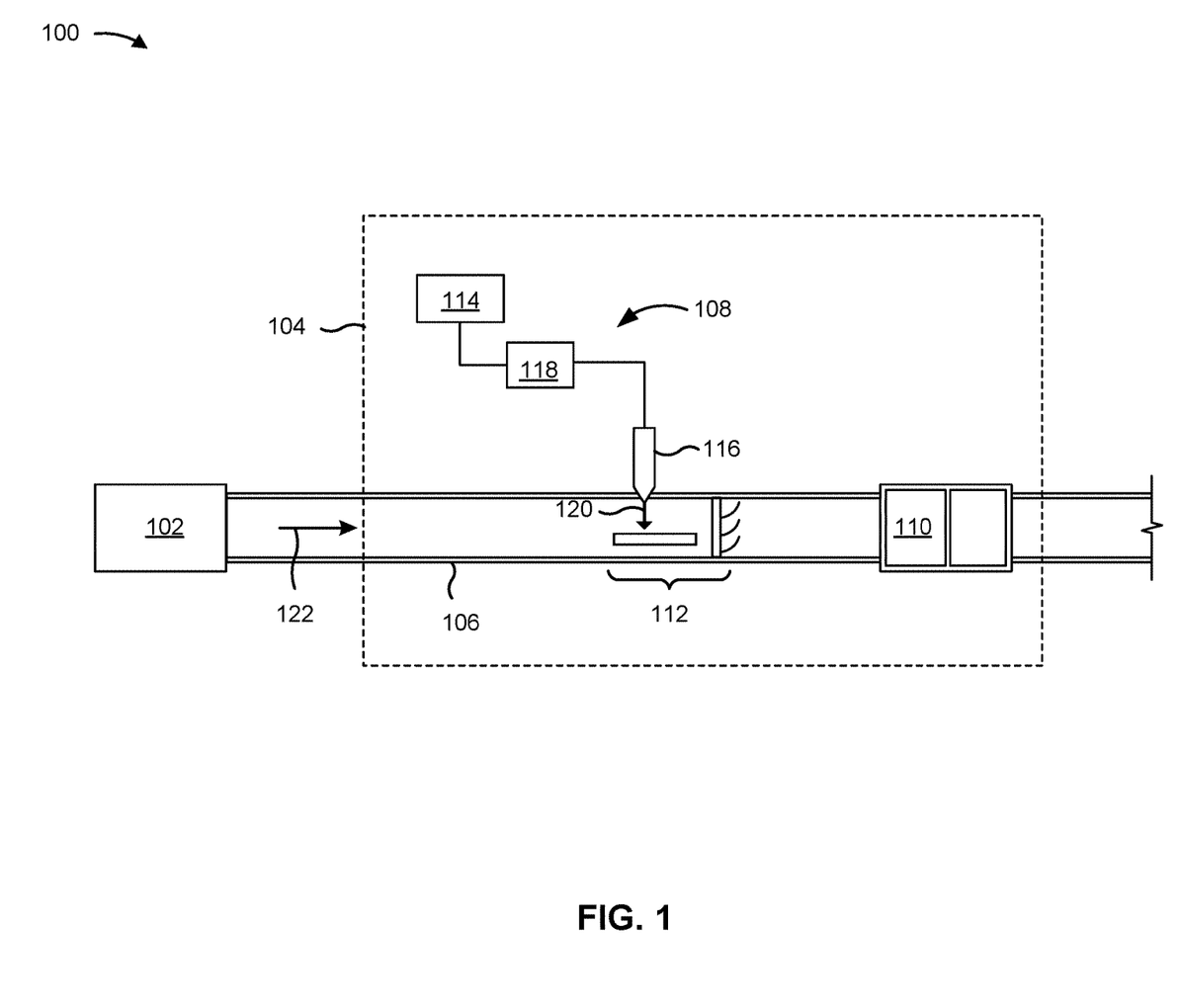
FIG. 1 is a diagram of an example power system.

FIG. 1 is a diagram of an example power system 100. The power system 100 includes an engine 102 and an exhaust aftertreatment system 104 that are fluidly connected via an exhaust conduit 106. The engine 102 may be an internal combustion engine, such as a diesel-powered engine, a gasoline-powered engine, and/or the like. The engine 102 is configured to expel exhaust gas into the exhaust conduit 106 to form an exhaust stream. The exhaust stream may include emission compounds, such as nitrous oxides (NOx), particulate matter, hydrocarbons, and/or the like.

The exhaust aftertreatment system 104, positioned downstream of the engine 102, is configured to reduce or remove the emission compounds in the exhaust stream to satisfy emission standards. To treat the NOx in the exhaust stream, the exhaust aftertreatment system 104 includes a reductant delivery module 108, an SCR module 110, and a two-stage mixer 112 therebetween. In some implementations, the exhaust aftertreatment system 104 may further include a diesel particular filter (DPF), to treat the particulate matter in the exhaust stream, and/or a diesel oxidation catalyst (DOC), to treat the hydrocarbons in the exhaust stream.

The reductant delivery module 108 includes a storage tank 114, a reductant injector 116, and a pump 118 fluidly connected therebetween. The storage tank 114 is configured to store reductant therein. The reductant is a fluid that is configured to react with the NOx in the exhaust stream to convert the NOx into other compounds, such as Dinitrogen ($N_2$), water ($H_2O$), Carbon Dioxide ($CO_2$), and/or the like. For example, the reductant may be a urea solution (e.g., diesel exhaust fluid (DEF)), an anhydrous ammonia, an aqueous ammonia, and/or the like.

The pump 118 is configured to pressurize and deliver the reductant from the storage tank 114 to the reductant injector 116 at a flow rate substantially proportional to a flow rate of the exhaust stream. The reductant injector 116 is fixedly mounted on the exhaust conduit 106 and is configured to dispense the reductant, from the storage tank 114, into the exhaust stream via an inlet in the exhaust conduit 106. The reductant may enter the exhaust stream in a direction 120 substantially perpendicular to a direction 122 of flow of the exhaust stream.

The SCR module 110, positioned downstream of the inlet, includes a catalyst that is configured to receive the exhaust stream and reduce a concentration of the NOx therein. To allow the exhaust stream to pass therethrough, the SCR module 110 may have a honeycomb or otherwise porous structure. The two-stage mixer 112, which will be described in detail below in connection with FIGS. 2-5, is fixedly mounted within the exhaust conduit 106 between the engine 102 and the SCR module 110. The two-stage mixer 112 is configured to mix the reductant supplied by the reductant injector 116 with the exhaust stream prior to the exhaust stream entering the SCR module 110.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, differently arranged devices than those shown in FIG. 1. Furthermore, two or more devices shown in FIG. 1 may be implemented within a single device, or a single device shown in FIG. 1 may be implemented as multiple, distributed devices. For example, the reductant delivery module 108 may include a plurality of reductant injectors to dispense the reductant into the exhaust stream.

Figure 2:
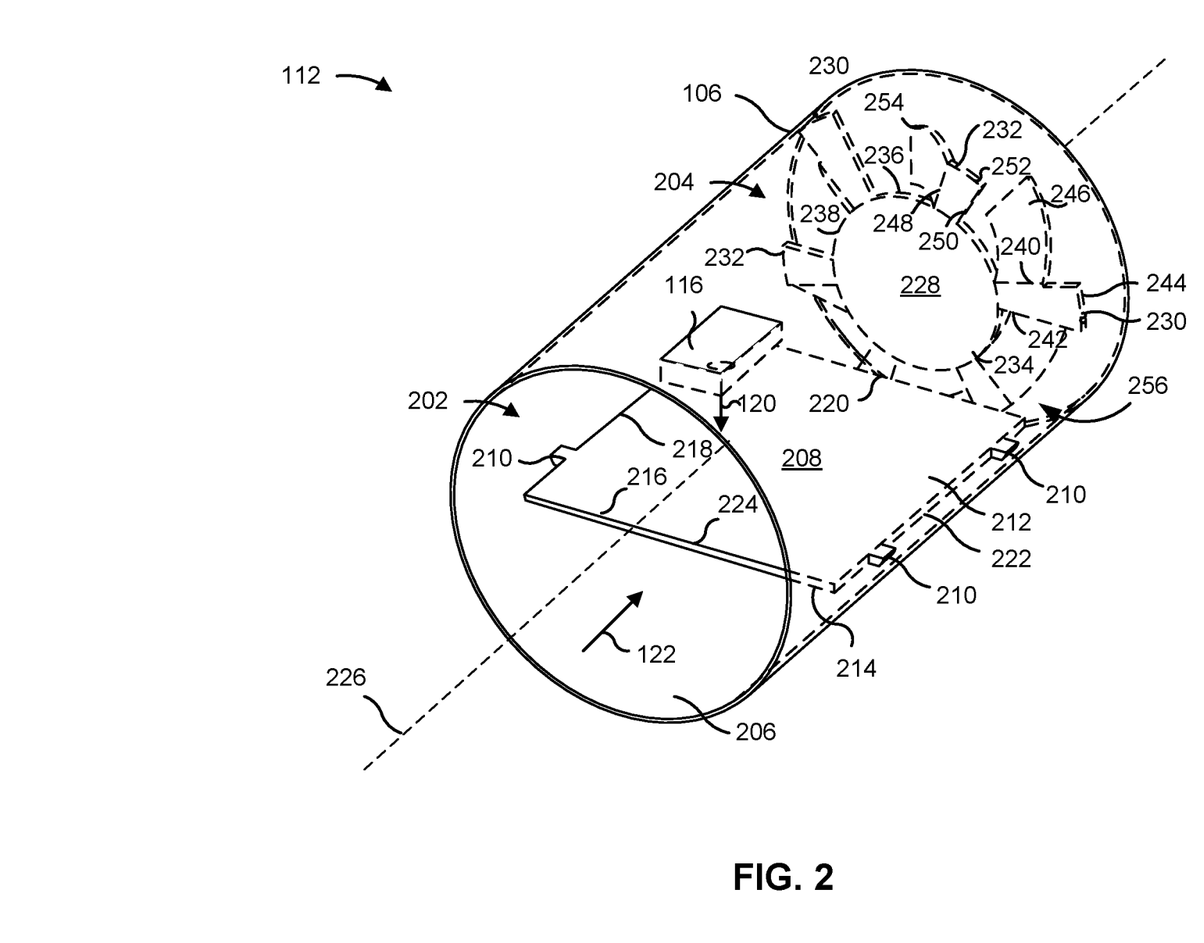
FIG. 2 is a perspective view of a two-stage mixer of the power system of FIG. 1.
Figure 3:
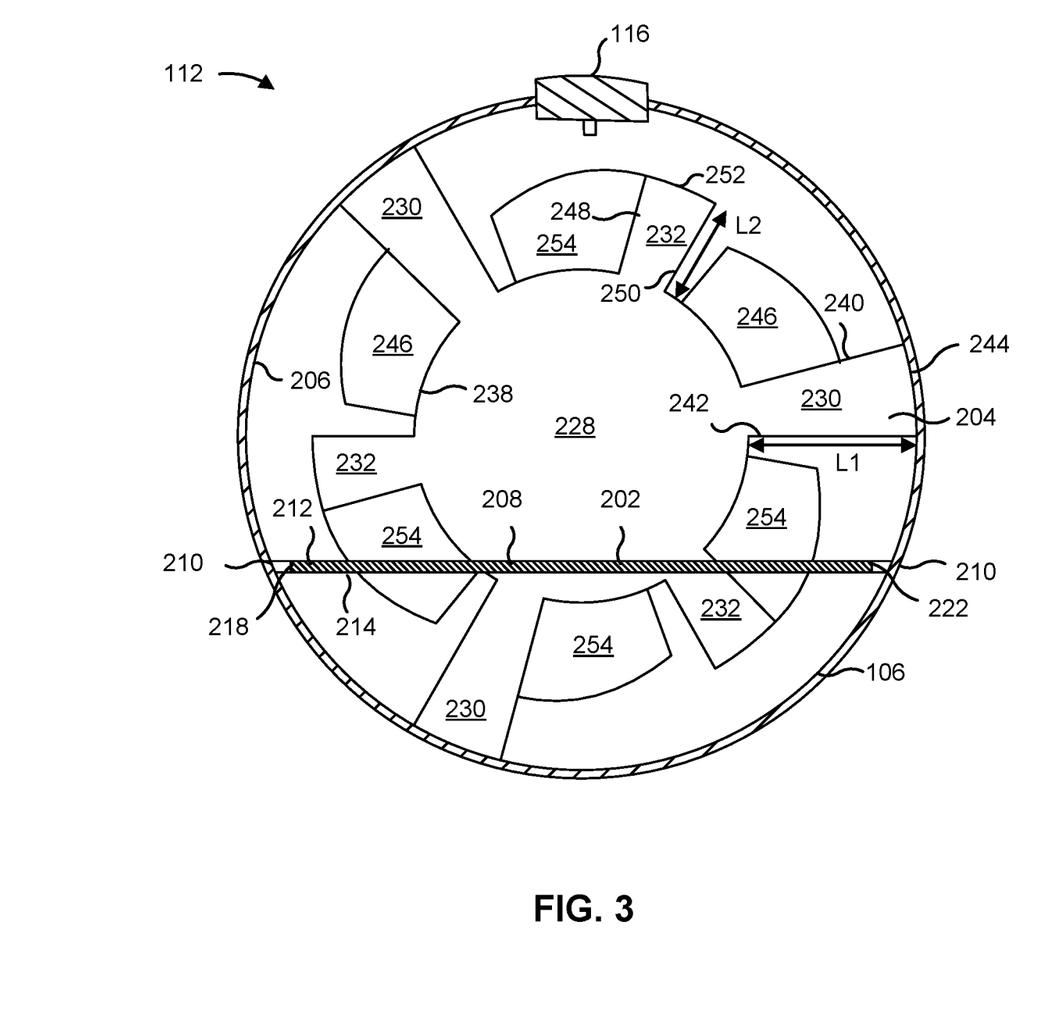
FIG. 3 is a front view of the two-stage mixer of FIG. 2.
Figure 4:
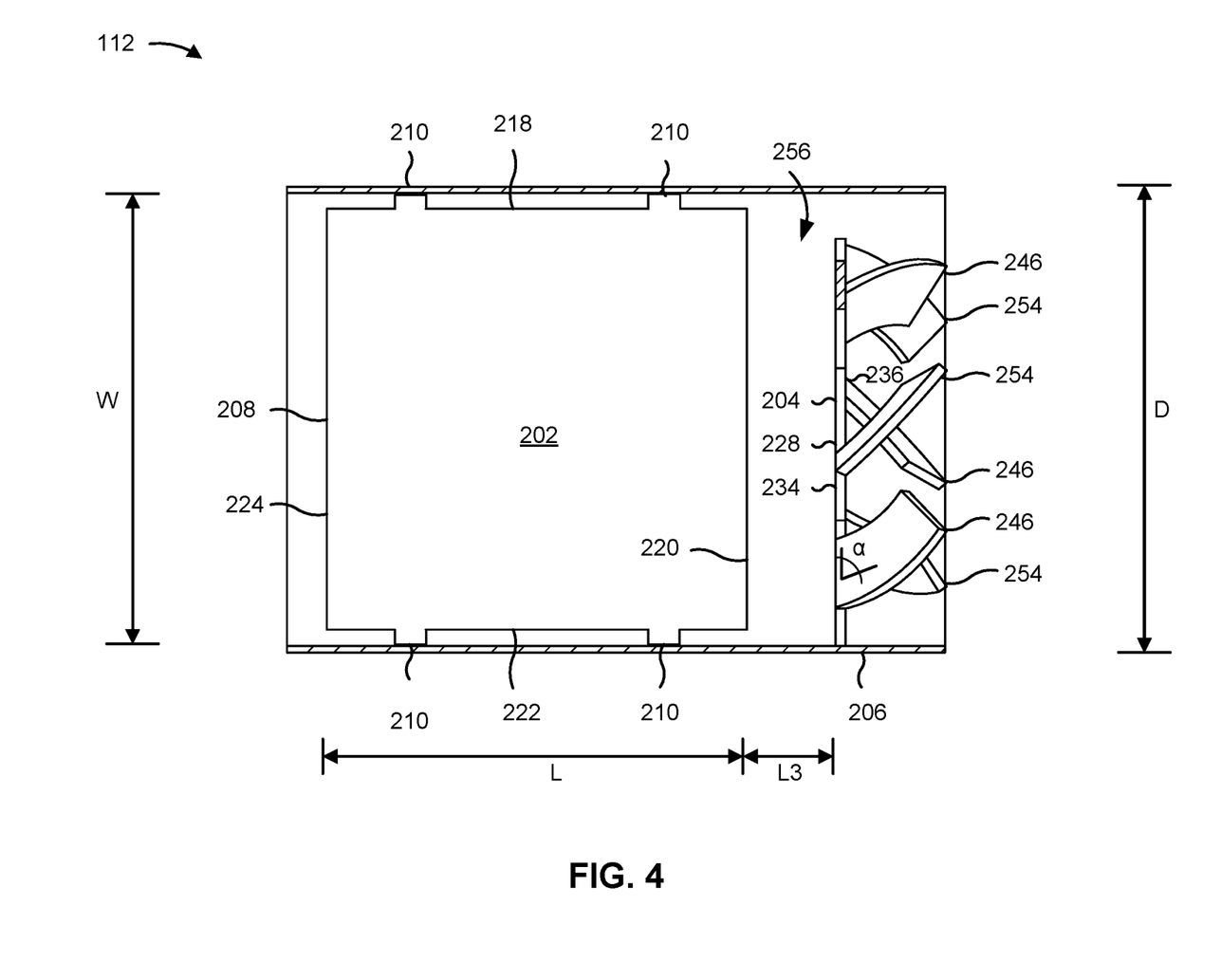
FIG. 4 is a top view of the two-stage mixer of FIG. 2.
Figure 5:
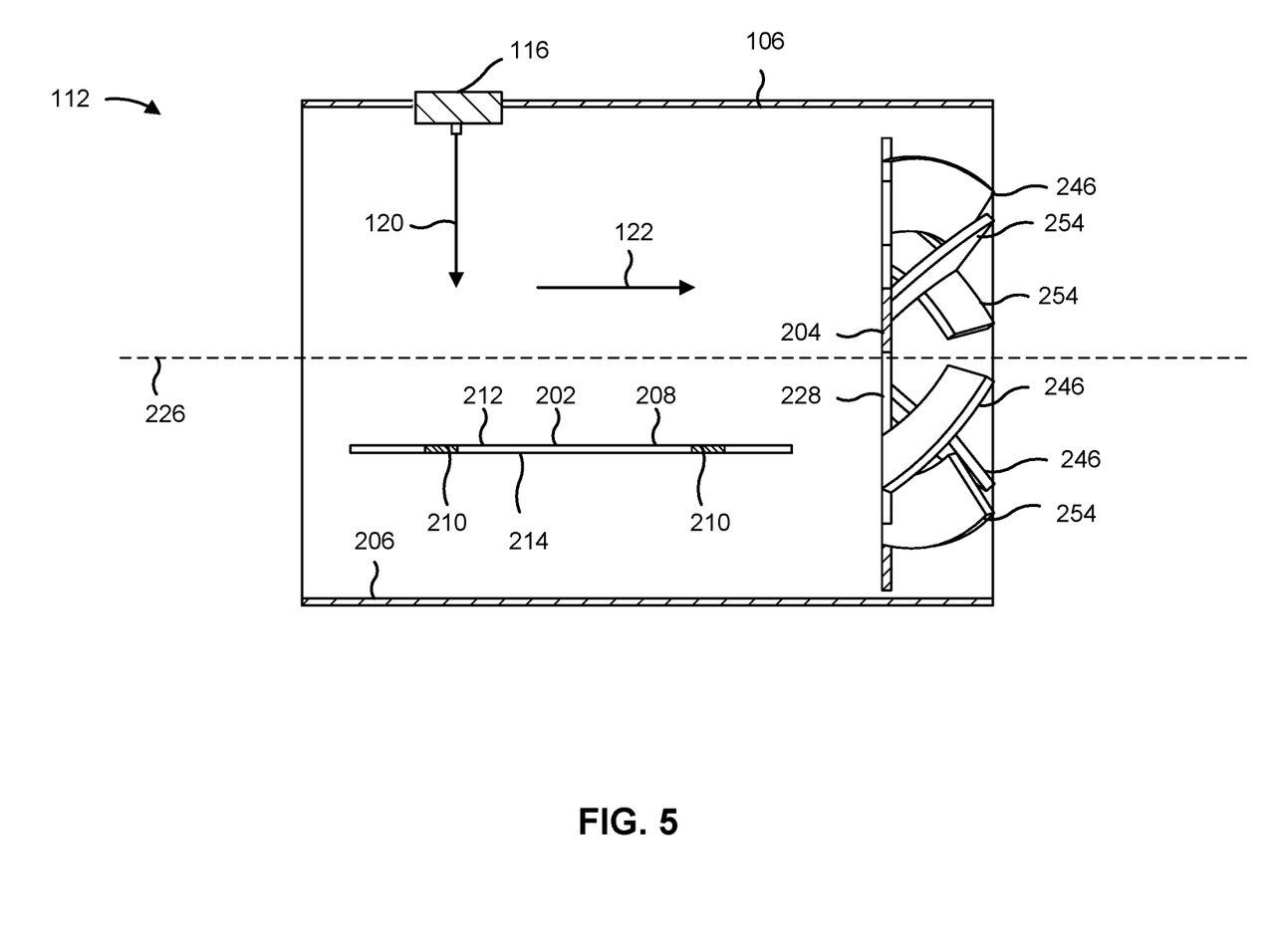
FIG. 5 is a side view of the two-stage mixer of FIG. 2.

FIGS. 2-5 are diagrams of the two-stage mixer 112 within a section of the exhaust conduit 106. FIG. 2 is a perspective view of the two-stage mixer 112. FIG. 3 is a front view of the two-stage mixer 112. FIG. 4 is a top view of the two-stage mixer 112. FIG. 5 is a side view of the two-stage mixer 112.

As shown in FIGS. 2-5, the two-stage mixer 112 includes a guiding element 202 and a mixing element 204 fixedly mounted to an interior 206 of the exhaust conduit 106. The guiding element 202 is structured and arranged within the exhaust conduit 106 to facilitate a first stage of mixing of the reductant with the exhaust stream. The first stage of mixing includes breaking apart droplets of the reductant and guiding the droplets toward the mixing element 204. The mixing element 204 is structured and arranged within the exhaust conduit 106 to facilitate a second stage of mixing of the reductant with the exhaust stream. The second stage of mixing includes further breaking apart the droplets of the reductant and generating swirling and tumbling motions in the exhaust stream to uniformly mix the reductant with the exhaust gas.

The guiding element 202 includes a planar body 208 having a plurality of mounting tabs 210 extending therefrom to facilitate attachment to the exhaust conduit 106. The planar body 208 includes an upper surface 212, a lower surface 214, and a peripheral surface 216 connecting the upper surface 212 to the lower surface 214. The peripheral surface 216 includes a first side 218, a second side 220, a third side 222, and a fourth side 224. The first side 218 of the peripheral surface 216 is integrally connected to a first subset of the plurality of mounting tabs 210. The third side 222 of the peripheral surface 216, which opposes the first side 218 of the peripheral surface 216, is integrally connected a second subset of the plurality of mounting tabs 210. The plurality of mounting tabs 210 are fixedly attached to the interior 206 of the exhaust conduit 106 (e.g., via welding, soldering, and/or the like).

While four mounting tabs are shown (e.g., in FIG. 4), in practice, it should be understood that a different number of mounting tabs may be used (e.g., six mounting tabs, eight mounting tabs, and/or the like). In some implementations, to simplify manufacturing of the guiding element 202, the guiding element 202 may not include the plurality of mounting tabs 210. Thus, in such an example, the first side 218 and the third side 222 may be attached directly to the interior 206 of the exhaust conduit 106 (e.g., via welding, soldering, and/or the like).

To receive and break apart the droplets of the reductant being injected into the exhaust stream, the guiding element 202 is aligned with the reductant injector 116. For example, as shown in FIGS. 2 and 5, the fourth side 224 of the guiding element 202 may be positioned closer to reductant injector 116 than the second side 220 of the guiding element 202. To guide the droplets of the reductant toward a central portion of the mixing element 204, the guiding element 202 is arranged within the exhaust conduit 106 such that the first side 218 and the third side 222 extend in a direction substantially parallel to a central axis 226 of the exhaust conduit 106. Furthermore, as shown in FIGS. 2 and 5, the guiding element 202 may be positioned closer to a lower side of the exhaust conduit 106, such that the central axis 226 of the exhaust conduit 106 is between the reductant injector 116 and the guiding element 202.

The guiding element 202 may be formed from a single, integral piece of corrosion-resistant material, such as stainless steel. As shown in FIG. 4, in order to be fixed securely within the exhaust conduit 106, the guiding element 202 has a width "W" in a range of approximately 60% to approximately 100% of a diameter "D" of the exhaust conduit 106. In some implementations, the width "W" of the guiding element 202 may be in a range of approximately 80% to approximately 95% of the diameter "D" of the exhaust conduit 106. In some implementations, in order to deflect the droplets of the reductant towards the mixing element 204 while also preventing deposit formation on the guiding element 202, a length "L" of the guiding element 202 is substantially equal to the diameter "D" of the exhaust conduit 106. For example, if the diameter "D" of the exhaust conduit 106 is 5 inches, the width "W" of the guiding element 202 may be approximately 4.5 inches and the length "L" of the guiding element 202 may be approximately 5 inches. Other sizes and shapes of the guiding element 202 are possible.

As further shown in FIGS. 2-5, the mixing element 204 includes a central disk 228 having a plurality of mounting arms 230 and a plurality of blades 232 extending radially therefrom. The central disk includes a front surface 234, a rear surface 236, and a circumferential surface 238 connecting the front surface 234 to the rear surface 236. The plurality of mounting arms 230 are spaced substantially equidistantly about the circumferential surface 238 of central disk 228. The plurality of blades 232 are spaced substantially equidistantly about the circumferential surface 238 of the central disk 228 and are circumferentially offset from the plurality of mounting arms 230. Thus, as viewed from a direction facing the front surface 234 of the central disk 228, the plurality of mounting arms 230 and the plurality of blades 232 are alternatingly arranged around the circumferential surface 238 of the central disk 228.

For description purposes, the structures of a single mounting arm 230 and a single blade 232 of the mixing element 204 are described below. It should be understood, however, that each mounting arm may have the same or a similar structure to the structure of the mounting arm 230 described below. In addition, each blade may have the same or similar structure to the structure of the blade 232 described below.

The mounting arm 230 has a first side edge 240, a second side edge 242, and an outer edge 244 connecting the first side edge 240 to the second side edge 242. The first side edge 240 is integrally connected to a first fin 246, which extends somewhat toward an adjacent blade 232. As shown in FIG. 4, to create a swirling and/or tumbling motion in the exhaust stream, the fin 246 is bent at an angle "α" relative to the mounting arm 230 in the direction 122 of the flow of the exhaust stream. The angle "α" may be in a range of approximately 0 degrees to approximately 90 degrees. In some implementations, the angle "α" may be in a range of approximately 20 degrees to approximately 40 degrees. As shown in FIG. 3, the first side edge 240 and the second side edge 242 have a first length "L1" that allows the mounting arm 230 to be fixedly secured to the exhaust conduit 106. The outer edge 244 is fixedly attached to the interior 206 of the exhaust conduit 106 via welding, soldering, and/or the like.

The blade 232 has a first side edge 248, a second side edge 250, and an outer edge 252 connecting the first side edge 248 to the second side edge 250. The first side edge 248 is integrally connected to a second fin 254, which extends somewhat toward an adjacent mounting arm 230. Similar to that described above with respect to the first fin 246, the second fin 254 is bent at the angle "α" relative to the blade 232 in the direction 122 of the flow of the exhaust stream. As shown in FIG. 3, to minimize flow restriction, the first side edge 248 and the second side edge 250 have a second length "L2" that is less than the first length "L1" of the mounting arm 230.

While the mixing element 204 is shown as having three mounting arms 230 with three corresponding first fins 246 and three blades 232 with three corresponding second fins 254, it should be understood that the mixing element 204 may have a different number of mounting arms, first fins, blades, and second fins (e.g., four, five, and/or the like). In some implementations, the guiding element 204 may have a simplified design (e.g., with fewer or no fins, fewer or no blades, and/or the like). Furthermore, while the first fins 246 and the second fins 255 are shown as extending in a counter-clockwise direction around the central disk 228 (e.g., when viewed in a direction facing the front surface 234 of the central disk 228), it should be understood that the first fins 246 and the second fins 254 may extend in the clockwise direction around the central disk 228 (e.g., by instead providing them on the second side edges 242 and 250).

To uniformly mix the reductant with the exhaust stream, the mixing element 204 is mounted within the exhaust conduit 106 such that the front surface 234 of the central disk 228 is substantially perpendicular to the upper surface 212 of the planar body 208 of the guiding element 202. In such a position, the mixing element 204 is configured to divert portions of the exhaust stream, thereby creating turbulence in the flow that accelerates the formation of ammonia gas. To allow the reductant to be dispersed throughout a cross-section of the exhaust conduit 106, the mixing element 204 is arranged downstream of the guiding element 202 to define a gap 256 between the second side 220 of the guiding element 202 and the front surface 234 of the central disk 228. The gap 256 has a length "L3" in a range of approximately 10% to approximately 200% of the diameter "D" of the exhaust conduit 106. For example, if the diameter "D" of the exhaust conduit 106 is 5 inches, the length "L3" of the gap 256 may be in a range of approximately 0.5 inches to approximately 10 inches.

The mixing element 204 is integrally formed from a single piece of corrosion-resistant material, such as stainless steel. The central disk 228, the plurality of mounting arms 230, and the plurality of blades 232 may be substantially planar. Other sizes and shapes of the mixing element 204 are possible.

As indicated above, FIGS. 2-5 are provided as an example. Other examples may differ from what is described with regard to FIGS. 2-5. The number and arrangement of components shown in FIGS. 2-5 are provided as an example. In practice, there may be additional components, fewer components, differently shaped components, different sized components, or differently arranged components than those shown in FIGS. 2-5. For example, the central disk 228 may have a polygonal shape (e.g., hexagonal) rather than a circular shape. As a further example, the plurality of mounting arms 230 and/or the plurality of blades 232 may be substantially rectangular in shape rather than tapered.

INDUSTRIAL APPLICABILITY

The two-stage mixer 112 of the present disclosure is particularly applicable in a system for mixing two or more fluids, such as the exhaust aftertreatment system 104. The exhaust aftertreatment system 104 may be implemented in a vehicle propelled by an internal combustion engine, such as a motor vehicle, a railed vehicle, a watercraft, an aircraft, and/or the like.

Due to the structure and arrangement of the two-stage mixer 112 relative to the reductant injector 116, the two-stage mixer 112 has a number of benefits. For example, because the two-stage mixer 112 is arranged within the exhaust conduit 106 to deflect and divert the droplets of the reductant as the reductant enters the exhaust stream, the two-stage mixer 112 inhibits the formation of deposits within the exhaust aftertreatment system 104. As a result, the two-stage mixer 112 is configured to prevent blockages in the flow of the exhaust stream, which may damage the exhaust aftertreatment system 104. Furthermore, the two-stage mixer 112 is capable of uniformly mixing the reductant with the exhaust stream in varying conditions. For example, the two-stage mixer 112 is effective in high-flow conditions (e.g., with a flow rate of the exhaust stream being approximately 11,800 kg/hr, and the flow rate of the reductant being approximately 31 kg/hr), in low-flow conditions (e.g., with the flow rate of the exhaust stream being approximately 2,000 kg/hr, and the flow rate of the reductant being approximately 6 kg/hr), in a linear section of the exhaust conduit 106, in a curved section of the exhaust conduit 106, and/or the like. Additionally, due to the simplicity in the design of the two-stage mixer 112, the two-stage mixer 112 is cost-effective, easy to manufacture and install, and easily adjustable to fit different applications.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A two-stage mixer, comprising:
a guiding element that is configured to be fixedly mounted to an interior of an exhaust conduit; and
a mixing element that is configured to be fixedly mounted to the interior of the exhaust conduit in a position downstream from the guiding element, the mixing element comprising:
a central disk,
a plurality of mounting arms extending radially from the central disk,
wherein each mounting arm of the plurality of mounting arms has a first side edge having a first length, and
wherein at least one mounting arm of the plurality of mounting arms has a fin extending from the first side edge, and
a plurality of blades extending radially from the central disk,
wherein each blade of the plurality of blades has a second side edge having a second length that is less than the first length,
wherein at least one blade of the plurality of blades has a fin extending from the second side edge.

2. The two-stage mixer of claim 1, wherein:
the plurality of mounting arms are spaced substantially equidistantly about a circumferential surface of the central disk; and
the plurality of blades are spaced substantially equidistantly about the circumferential surface of the central disk and circumferentially offset from the plurality of blades.

3. The two-stage mixer of claim 1, wherein the guiding element comprises a planar body.

4. The two-stage mixer of claim 1, wherein:
the plurality of mounting arms comprise three mounting arms; and
the plurality of blades comprise three blades.

5. The two-stage mixer of claim 1, wherein:
the guiding element is configured to break apart and guide droplets of reductant toward the mixing element; and
the mixing element is configured to further break apart the droplets of reductant and generate swirling and tumbling motions of the droplets of reductant and exhaust gas to mix the droplets of reductant with the exhaust gas.

6. The two-stage mixer of claim 1, wherein the plurality of mounting arms are configured to be welded to the interior of the exhaust conduit.

7. The two-stage mixer of claim 1, wherein the mixing element is integrally formed from a single piece of stainless steel.

8. A two-stage mixer, comprising:
an exhaust conduit having an interior;
a guiding element that is fixedly mounted to the interior of the exhaust conduit, the guiding element comprising a planar body; and
a mixing element that is fixedly mounted to the interior of the exhaust conduit in a position downstream from the guiding element, the mixing element comprising:
a central disk,
a plurality of mounting arms extending radially from the central disk and fixedly secured to the interior of the exhaust conduit,
wherein each mounting arm of the plurality of mounting arms has a first side edge having a first fin extending therefrom, and
a plurality of blades extending radially from the central disk,
wherein each blade of the plurality of blades has a second side edge having a second fin extending therefrom.

9. The two-stage mixer of claim 8, wherein the guiding element is fixedly mounted to the interior of the exhaust conduit via a plurality of mounting tabs that extend from a peripheral surface of the planar body.

10. The two-stage mixer of claim 8, wherein the guiding element is positioned within the exhaust conduit such that the planar body is substantially perpendicular to the central disk of the mixing element.

11. The two-stage mixer of claim 8, wherein
the guiding element and the mixing element are spaced apart along the exhaust conduit to define a gap therebetween; and
the gap has a length that is in a range of approximately 10% to approximately 200% of a diameter of the exhaust conduit.

12. The two-stage mixer of claim 8, wherein the guiding element has
a width that is in a range of approximately 60% to approximately 100% of a diameter of the exhaust conduit; and
a length that is substantially equal to the diameter of the exhaust conduit.

13. The two-stage mixer of claim 8, wherein
the first fins extend from the plurality of mounting arms at an angle; and
the second fins extend from the plurality of blades at the angle.

14. The two-stage mixer of claim 13, wherein the angle is in a range of approximately 20 degrees to approximately 40 degrees.

15. An exhaust aftertreatment system comprising:
one or more reductant injectors that are configured to inject reductant into an exhaust stream;
a guiding element that is configured to be arranged within the exhaust stream to break apart and guide droplets of the reductant along the exhaust stream; and
a mixing element that is configured to be arranged within the exhaust stream in a position downstream and spaced apart from the guiding element to cause the droplets to be distributed within the exhaust stream, the mixing element comprising:
a central disk, and
a plurality of mounting arms extending radially from the central disk and having a first length, and
a plurality of blades extending radially from the central disk and having a second length that is less than the first length.

16. The exhaust aftertreatment system of claim 15, further comprising:
a selective catalytic reduction module that is configured to receive and process the exhaust stream after the droplets have been distributed within the exhaust stream by the mixing element.

17. The exhaust aftertreatment system of claim 15, wherein the central disk, the plurality of mounting arms, and the plurality of blades are substantially planar.

18. The exhaust aftertreatment system of claim 15, wherein the plurality of mounting arms and the plurality of blades are alternatingly arranged around a circumferential surface of the central disk.

19. The exhaust aftertreatment system of claim 15, wherein
each mounting arm of the plurality of mounting arms has a first side edge having a first length and having a first fin extending therefrom; and
each blade of the plurality of blades has a second side edge having a second length that is less than the first length and having a second fin extending therefrom.

20. The exhaust aftertreatment system of claim 19, wherein
the first fins extend from the plurality of mounting arms along a direction of flow of the exhaust stream; and
the second fins extend from the plurality of blades along the direction of flow of the exhaust stream.

* * * * *